(12) United States Patent
Wang

(10) Patent No.: US 11,795,956 B2
(45) Date of Patent: Oct. 24, 2023

(54) CEILING FAN WITH CEILING PROJECTION FUNCTION

(71) Applicant: AIR COOL INDUSTRIAL CO., LTD., Taichung (TW)

(72) Inventor: Cliff Wang, Taichung (TW)

(73) Assignee: AIR COOL INDUSTRIAL CO., LTD., Taichung (TW)

(*) Notice: Subject to any disclaimer, the term of this patent is extended or adjusted under 35 U.S.C. 154(b) by 225 days.

(21) Appl. No.: 17/336,290

(22) Filed: Jun. 1, 2021

(65) Prior Publication Data

US 2022/0381429 A1 Dec. 1, 2022

(51) Int. Cl.
| | | |
|---|---|---|
| F04D 25/08 | (2006.01) | |
| F21V 33/00 | (2006.01) | |
| G03B 21/16 | (2006.01) | |
| G03B 21/20 | (2006.01) | |
| F21W 121/00 | (2006.01) | |
| F21Y 115/10 | (2016.01) | |
| F21Y 113/13 | (2016.01) | |
| F04D 29/00 | (2006.01) | |

(52) U.S. Cl.
CPC ........ F04D 25/088 (2013.01); F21V 33/0096 (2013.01); G03B 21/16 (2013.01); G03B 21/2033 (2013.01); F04D 29/005 (2013.01); F21W 2121/008 (2013.01); F21Y 2113/13 (2016.08); F21Y 2115/10 (2016.08)

(58) Field of Classification Search
CPC .. F04D 25/088; F04D 29/005; F21V 33/0096; G03B 21/16; G03B 21/2033; F21W 2121/008; F21Y 2113/13; F21Y 2115/10
See application file for complete search history.

(56) References Cited

U.S. PATENT DOCUMENTS

| | | | |
|---|---|---|---|
| 6,302,556 B1* | 10/2001 | Filip | F21V 33/0096 362/404 |
| 11,236,753 B1* | 2/2022 | Campbell | F04D 29/005 |
| 2001/0030868 A1* | 10/2001 | McKinley | F21V 33/0096 362/355 |
| 2003/0129057 A1* | 7/2003 | Frampton | F04D 25/088 416/19 |
| 2015/0381086 A1* | 12/2015 | Peterson | F04D 25/088 318/400.3 |

* cited by examiner

Primary Examiner — Bryan M Lettman
(74) Attorney, Agent, or Firm — PAI PATENT & TRADEMARK LAW FIRM; Chao-Chang David Pai

(57) ABSTRACT

A ceiling fan with a ceiling projection function includes a ceiling fan body and a ceiling fan housing. The ceiling fan body includes a plurality of blades, a motor that drives the blades to rotate, and a hanging rod. The ceiling fan housing is provided with a pattern hole unit and a light-emitting unit. The pattern hole unit has at least one pattern hole. The pattern hole of the pattern hole unit passes through the ceiling fan housing. The light-emitting unit has at least one light-emitting member. When in use, the light-emitting member of the light-emitting unit projects a light beam passing through the pattern hole of the pattern hole unit to project a pattern of the pattern hole of the pattern hole unit outside the ceiling fan housing and above the blades.

3 Claims, 6 Drawing Sheets

CEILING FAN WITH CEILING PROJECTION FUNCTION

FIELD OF THE INVENTION

The present invention relates to a ceiling fan with a lamp, and more particularly to a ceiling fan with a ceiling projection function.

BACKGROUND OF THE INVENTION

A conventional ceiling fan includes a hanging rod, a plurality of blades, and a motor that drives the blades to rotate. The hanging rod is connected to a bracket. The bracket is generally fixed to the ceiling. A projection device is arranged separately from the ceiling fan. The projection device is disposed under the ceiling fan, so as to facilitate the user to operate the projection device. However, when the projection device is in use, the image projected by the projection device will be interfered by the blades, motor and hanging rod of the ceiling fan, resulting in incomplete projection of the image, and inconvenience in use. Accordingly, the inventor of the present invention has devoted himself based on his many years of practical experiences to solve these problems.

SUMMARY OF THE INVENTION

The primary object of the present invention is to provide a ceiling fan with a ceiling projection function, which can prevent the projected pattern from being interfered so that the pattern can be clearly displayed on the ceiling.

In order to achieve the above object, the present invention provides a ceiling fan with a ceiling projection function. The ceiling fan comprises a ceiling fan body and a ceiling fan housing. The ceiling fan body includes a plurality of blades, a motor that drives the blades to rotate, and a hanging rod. The ceiling fan housing is provided with a pattern hole unit. The pattern hole unit has at least one pattern hole. The pattern hole of the pattern hole unit passes through the ceiling fan housing. A light-emitting unit is provided inside the ceiling fan housing. The light-emitting unit has at least one light-emitting member.

When in use, the light-emitting member of the light-emitting unit projects a light beam passing through the pattern hole of the pattern hole unit to project a pattern of the pattern hole of the pattern hole unit outside the ceiling fan housing and above the blades. The projected pattern won't be interfered and can be clearly displayed on the ceiling.

DETAILED DESCRIPTION OF THE PREFERRED EMBODIMENTS

Embodiments of the present invention will now be described, by way of example only, with reference to the accompanying drawings.

Figure 1:
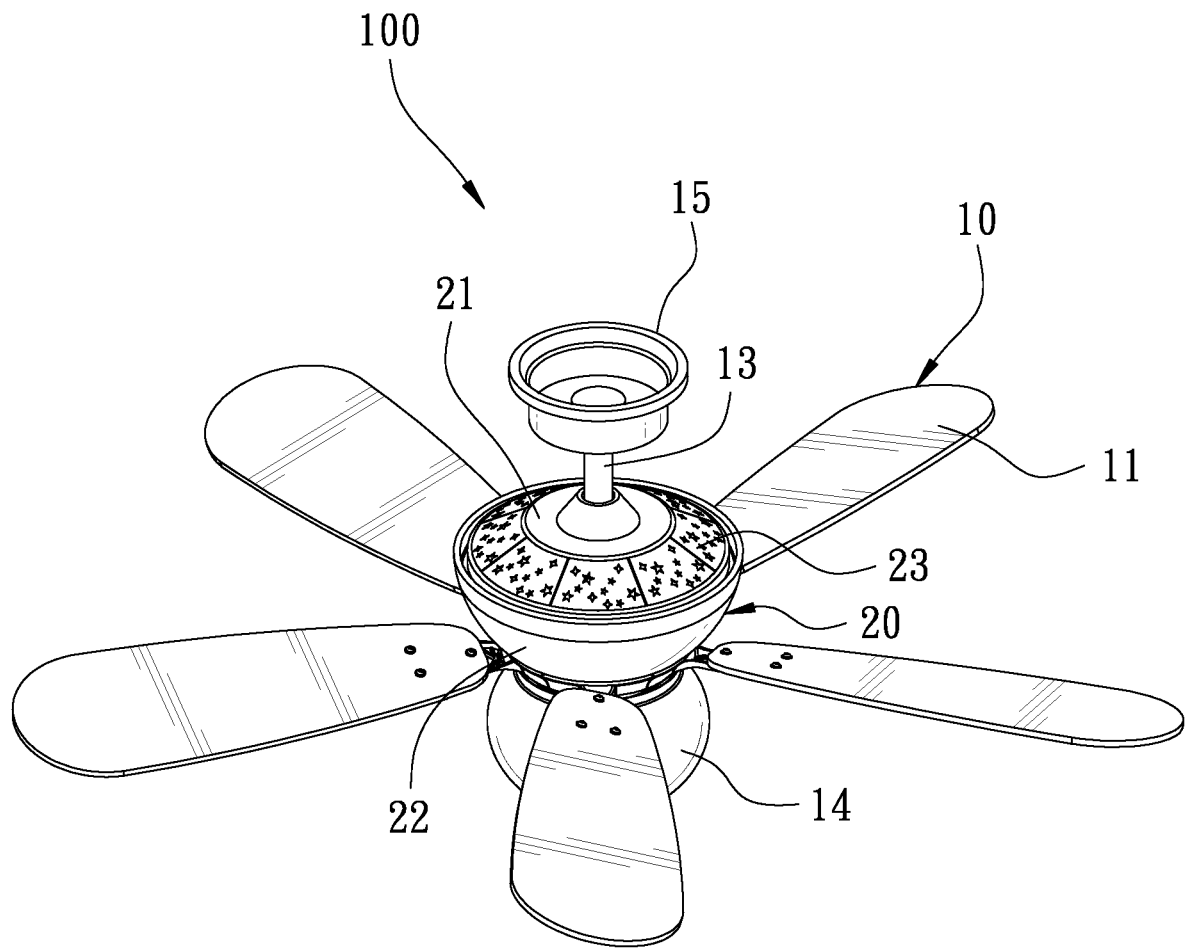
FIG. 1 is a perspective view in accordance with a preferred embodiment of the present invention.
Figure 2:
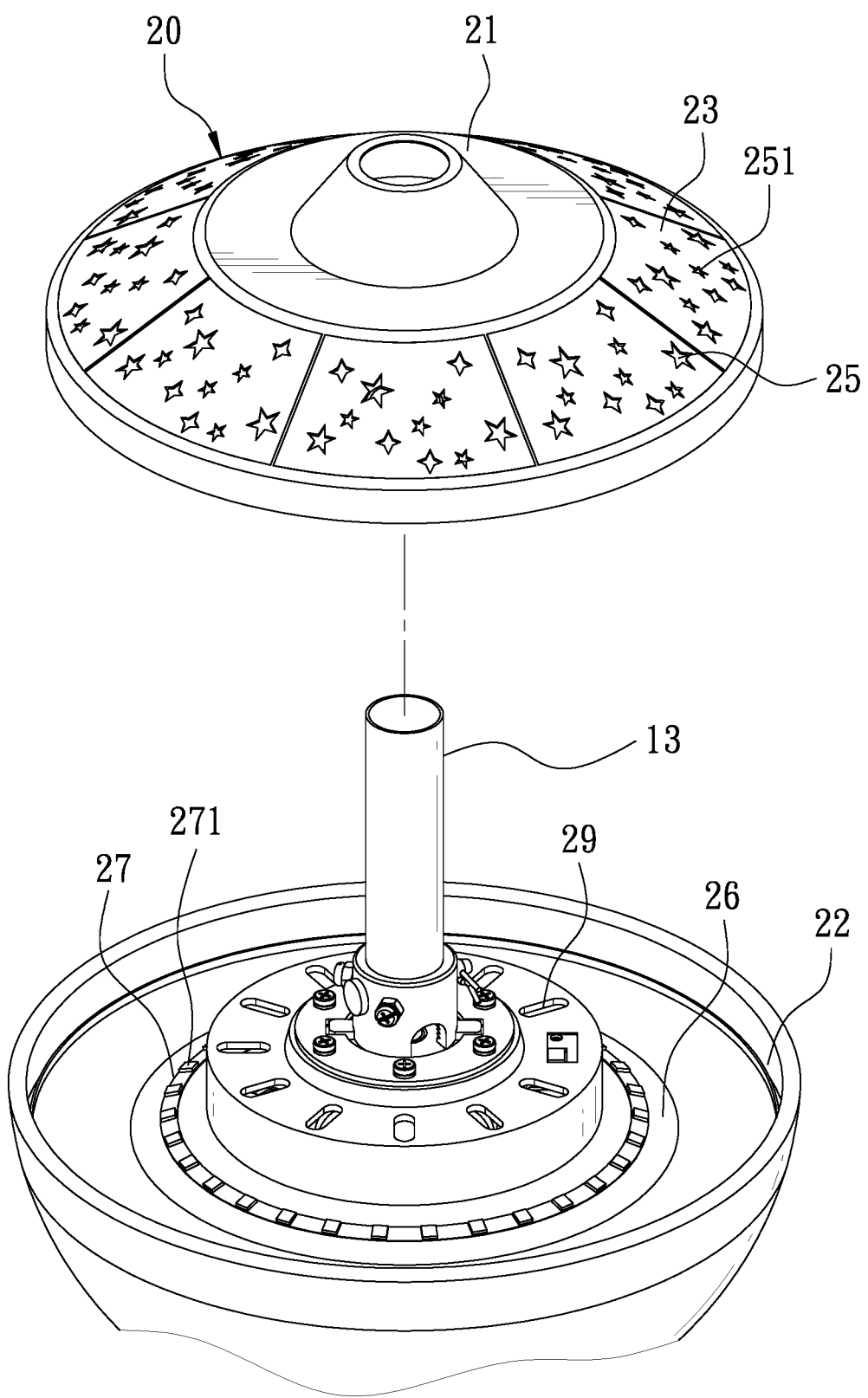
FIG. 2 is a partial perspective view in accordance with the preferred embodiment of the present invention.
Figure 3:
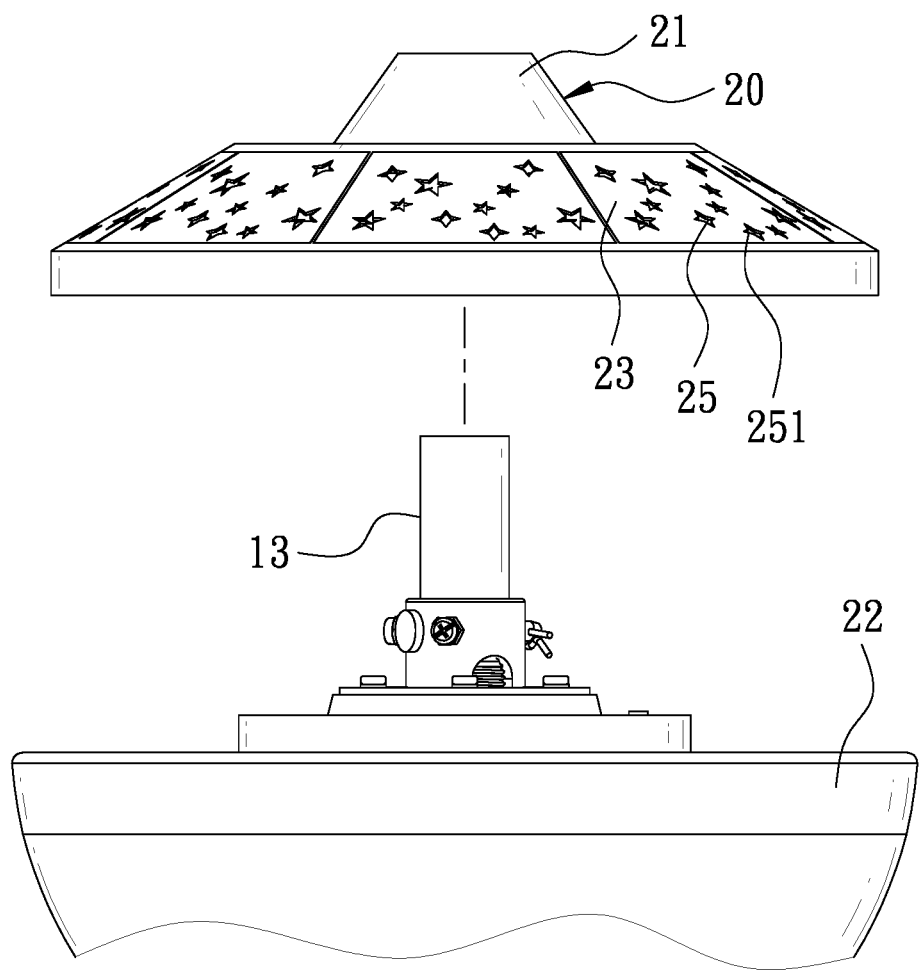
FIG. 3 is a side view in accordance with the preferred embodiment of the present invention.

FIG. 1 is a perspective view in accordance with a preferred embodiment of the present invention. FIG. 2 is a partial perspective view in accordance with the preferred embodiment of the present invention. FIG. 3 is a side view in accordance with the preferred embodiment of the present invention. The present invention discloses a ceiling fan 100 with a ceiling projection function, comprising a ceiling fan body 10 and a ceiling fan housing 20.

The ceiling fan body 10 includes a plurality of blades 11, a motor 12 that drives the blades 11 to rotate, and a hanging rod 13. The blades 11 are disposed below the motor 12 and arranged at equal intervals. The ceiling fan body 10 is provided with a lamp 14 under the blades 11 for illumination. The hanging rod 13 is connected to a bracket 15 to be fixed to the ceiling.

Figure 4:
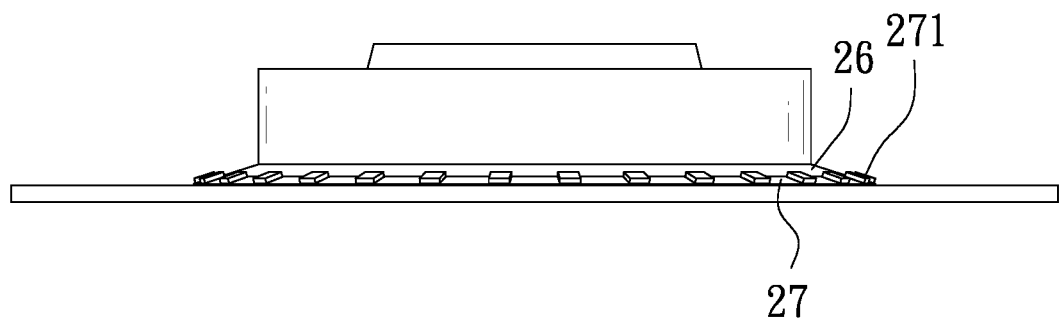
FIG. 4 is a partially enlarged view in accordance with the preferred embodiment of the present invention.
Figure 5:
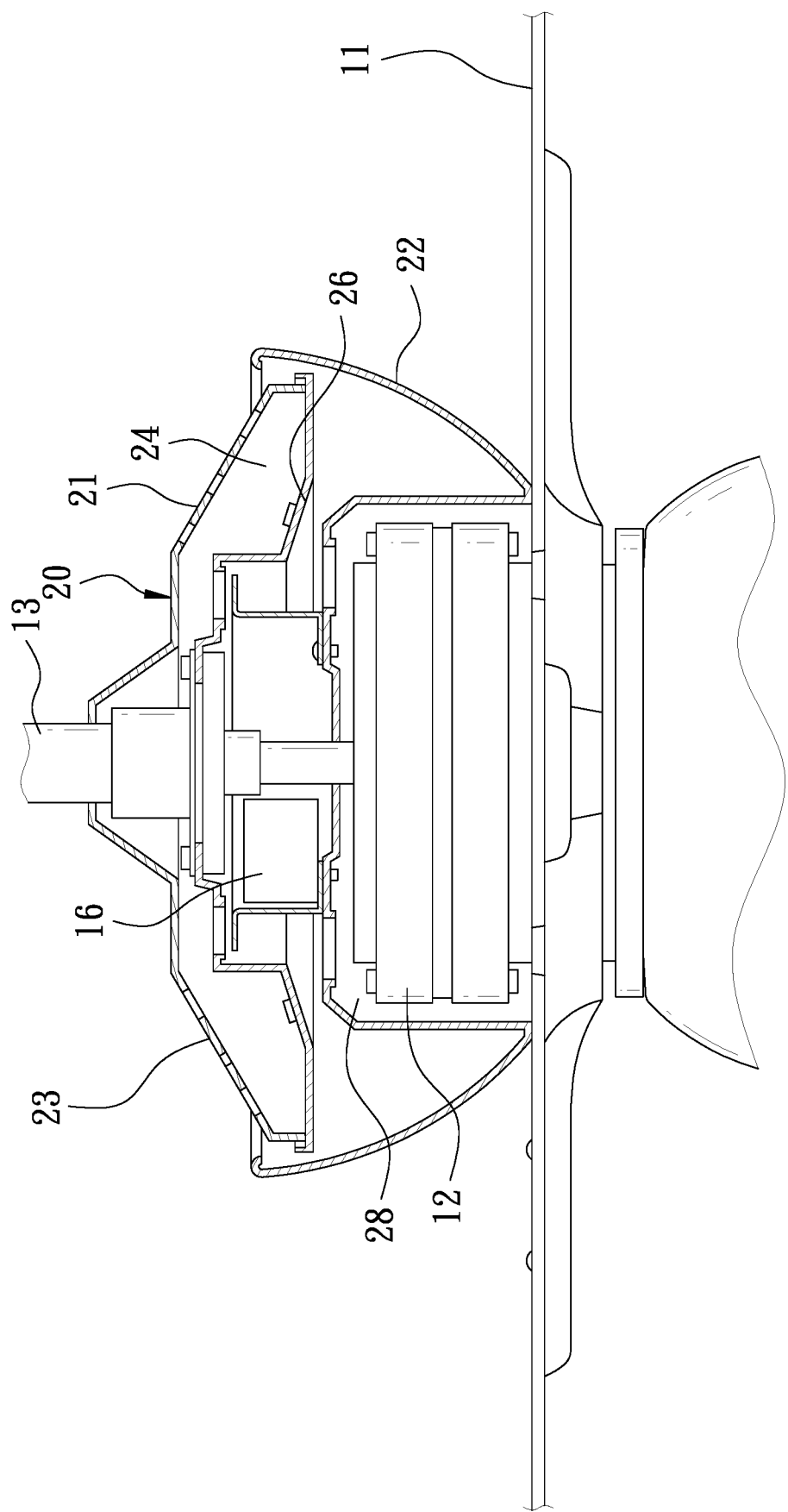
FIG. 5 is a cross-sectional view in accordance with the preferred embodiment of the present invention.

FIG. 4 is a partially enlarged view in accordance with the preferred embodiment of the present invention. FIG. 5 is a cross-sectional view in accordance with the preferred embodiment of the present invention. The ceiling fan housing 20 is disposed above the blades 11. The ceiling fan housing 20 includes a top cover 21 and a motor casing 22. The top cover 21 is arranged on top of the motor casing 22. The hanging rod 13 passes through the top cover 21 and the motor casing 22. The motor 12 is fixedly connected to the hanging rod 13. The top cover 21 has a first inclined surface 23 around the circumferential side of the hanging rod 13. The first inclined surface 23 is inclined downward from inside to outside. A first accommodating space 24 is defined between the top cover 21 and the motor casing 22. The ceiling fan housing 20 is provided with a pattern hole unit 25. The pattern hole unit 25 has at least one pattern hole 251. In this embodiment of the present invention, the pattern hole unit 25 has a plurality of pattern holes 251. The pattern holes 251 of the pattern hole unit 25 are arranged around the circumferential side of the hanging rod 13. The shape of the pattern holes 251 may be any pattern. The pattern hole 251 of the pattern hole unit 25 passes through the top cover 21 of the ceiling fan housing 20. The pattern holes 251 of the pattern hole unit 25 are arranged around the first inclined surface 23 and inclined downward from inside to outside. The motor casing 22 has a second inclined surface 26 in the first accommodating space 24. The second inclined surface 26 is arranged around the circumferential side of the hanging rod 13. The second inclined surface 26 is inclined downward from inside to outside. The ceiling fan housing 20 is provided with a light-emitting unit 27 in the first accommodating space 24. The light-emitting unit 27 has at least one light-emitting member 271. In this embodiment of the present invention, the light-emitting unit 27 has a plurality of light-emitting members 271. The light-emitting members 271 of the light-emitting unit 27 are arranged around the circumferential side of the hanging rod 13. The light-emitting members 271 are color-changing LED lights. The light-emitting members 271 of the light-emitting unit 27 are arranged around the second inclined surface 26. The light-emitting members 271 of the light-emitting unit 27 are arranged at equal intervals. The pattern hole 251 of the pattern hole unit 25 and the light-emitting member 271 of the light-emitting unit 27 are located above the blades 11. The light-emitting members 271 of the light-emitting unit 27 each have an illumination direction. The illumination direction of each light-emitting member 271 is an obliquely upward direction from inside to outside. Thus, the light-emitting member 271 of the light-emitting unit 27 projects a light beam passing through the pattern hole 251 of the pattern hole unit 25 to project the pattern of the pattern hole 251 of the pattern hole unit 25 outside the ceiling fan housing 20 and above the blades 11. In addition, a second accommodating space 28 is defined inside the motor casing 22 for accommodating the motor 12 and a power supply device 16. The motor casing 22 is formed with at least one heat dissipation hole 29 in the first accommodating space 24. In this embodiment of the present invention, the motor casing 22 is formed with a plurality of heat dissipation holes 29 in the first accommodating space 24 for the first accommodating space 24 to be in communication with the second accommodating space 28. The heat dissipation holes 29 are located at a position higher than the light-emitting members 271 of the light-emitting unit 27.

Figure 6:
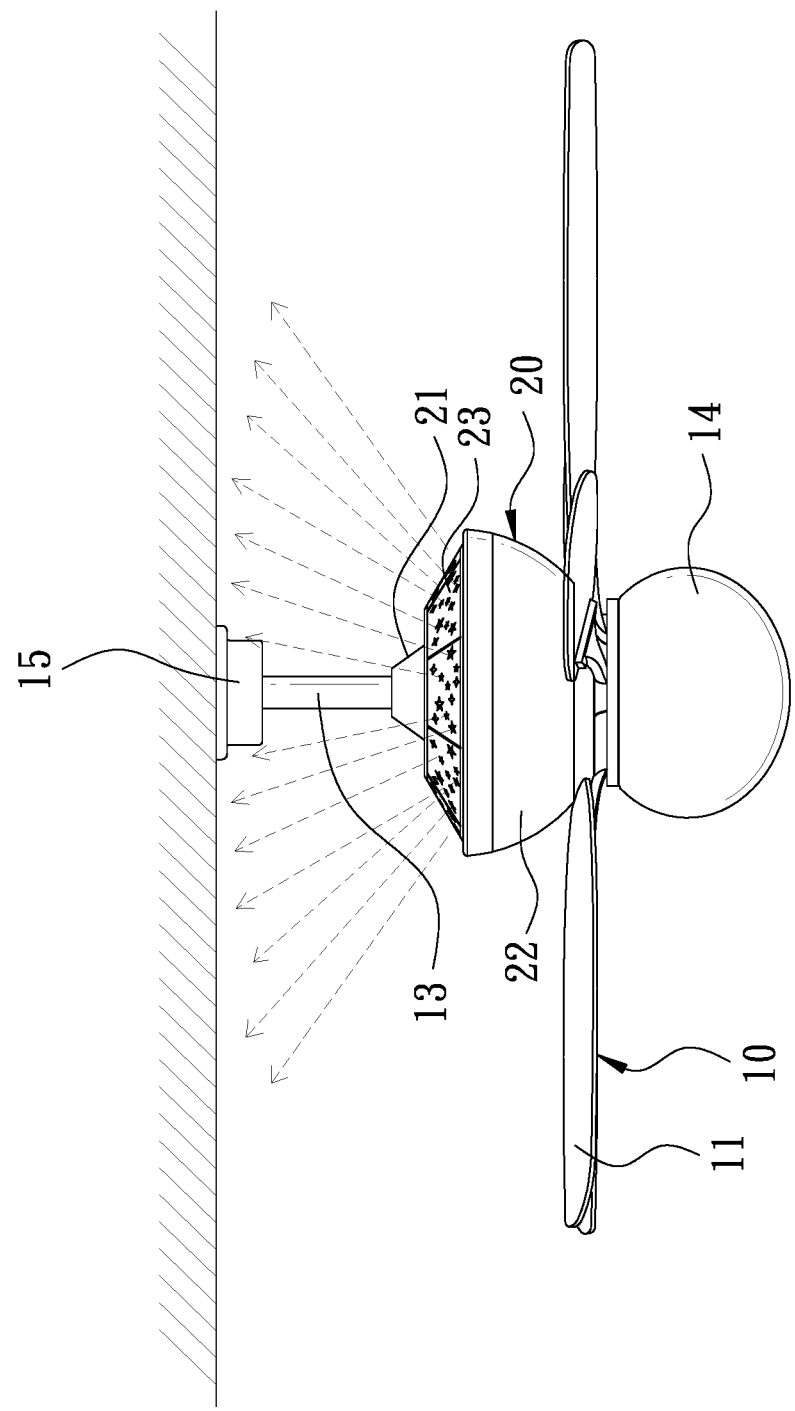
FIG. 6 is a schematic view in accordance with the preferred embodiment of the present invention when in use.

FIG. 6 is a schematic view in accordance with the preferred embodiment of the present invention when in use. When the ceiling fan 100 of the present invention is in use, first, the power supply device 16 is turned on so that the light-emitting members 271 of the light-emitting unit 27 light up. At this time, the light beam projected by the light-emitting members 271 of the light-emitting unit 27 passes through the pattern holes 251 of the pattern hole unit 25 and projects the patterns of the pattern holes 251 of the pattern hole unit 25 onto the ceiling. The light-emitting unit 27 is arranged above the blades 11, so the projected light beam will not be interfered by the blades 11, the motor 12 and the lamp 14, such that the projected patterns can be clearly and completely displayed on the ceiling.

In addition, because the light-emitting members 271 are LED lights, the temperature of the light-emitting members 27 is likely to be too high if used for a long time. The heat dissipation holes 29 are located at a position higher than the light-emitting members 271 of the light-emitting unit 27. Through the arrangement of the heat dissipation holes 29, the heat from the light-emitting members 27 can be dissipated through the second accommodating space 28 and the first accommodating space 24 and through the heat dissipation holes 29 and the pattern holes 251 of the top cover 21, achieving a heat dissipation effect.

It is worth mentioning that the top cover 21 has the first inclined surface 23 around the circumferential side of the hanging rod 13. The pattern holes 251 of the pattern hole unit 25 are arranged around the first inclined surface 23 and inclined downward from inside to outside. The motor casing 22 has the second inclined surface 26 in the first accommodating space 24. The second inclined surface 26 is arranged around the circumferential side of the hanging rod 13. The second inclined surface 26 is inclined downward from inside to outside. The light-emitting members 271 of the light-emitting unit 27 are arranged around the second inclined surface 26. Thereby, through the first inclined surface 23 and the second inclined surface 26, when the light beam projected by the light-emitting members 271 of the light-emitting unit 27 passes through the pattern holes 251 of the pattern hole unit 25, it can be irradiated obliquely, so that the projected patterns are not interfered by the hanging rod 13 and the bracket 15.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A ceiling fan, comprising:
   a ceiling fan body, including a plurality of blades, a motor that drives the blades to rotate, and a hanging rod for attaching to a ceiling; and
   a ceiling fan housing, the ceiling fan housing being provided with a pattern hole unit, the pattern hole unit having a plurality of pattern holes, the plurality of pattern holes of the pattern hole unit passing through the ceiling fan housing, a light-emitting unit being provided inside the ceiling fan housing, the light-emitting unit having a plurality of light-emitting members;
   wherein the plurality of pattern holes of the pattern hole unit and the plurality of light-emitting members of the light-emitting unit are located above the blades between the blades and the ceiling;
   wherein the ceiling fan housing includes a top cover and a motor casing, the top cover is arranged on top of the motor casing on a ceiling side of the motor casing, a first accommodating space is defined between the top cover and the motor casing, the plurality of pattern holes of the pattern hole unit pass through the top cover of the ceiling fan housing, and the light-emitting unit of the ceiling fan housing is disposed in the first accommodating space;
   wherein the hanging rod passes through the top cover and the motor casing, the plurality of pattern holes of the pattern hole unit are arranged around a circumferential side of the hanging rod, and the plurality of light-emitting members of the light-emitting unit are arranged around the circumferential side of the hanging rod;
   wherein the plurality of light-emitting members of the light-emitting unit each have an illumination direction, and the illumination direction of each light-emitting member of the plurality of light-emitting members is an obliquely upward direction from inside to outside;
   wherein the top cover has a first inclined surface around the circumferential side of the hanging rod, the plurality of pattern holes of the pattern hole unit are arranged around the first inclined surface and inclined downward from inside to outside, the motor casing has a second inclined surface in the first accommodating space, the second inclined surface is arranged around the circumferential side of the hanging rod, the second inclined surface is inclined downward from inside to outside, the plurality of light-emitting members of the light-emitting unit are arranged around the second inclined surface, and the plurality of light-emitting members of the light-emitting unit are arranged at intervals;
   wherein when in use, the plurality of light-emitting members of the light-emitting unit project a light beam passing through the plurality of pattern holes of the pattern hole unit to project a pattern of the plurality of pattern holes of the pattern hole unit outside the ceiling fan housing.

2. The ceiling fan as claimed in claim 1, further comprising a power supply device, a second accommodating space being defined inside the motor casing for accommodating the motor and the power supply device, the motor casing being formed with at least one heat dissipation hole in the first accommodating space for the first accommodating space to be in communication with the second accommodating space, the motor being fixedly connected to the hanging rod, the heat dissipation hole being located at a position closer to the ceiling than the plurality of light-emitting members of the light-emitting unit.

3. The ceiling fan as claimed in claim 2, wherein the plurality of light-emitting members are color-changing LED lights.

\* \* \* \* \*